United States Patent
Hasegawa et al.

(10) Patent No.: US 10,203,122 B2
(45) Date of Patent: Feb. 12, 2019

(54) AIR-CONDITIONING AND VENTILATION APPARATUS

(71) Applicant: Mitsubishi Electric Corporation, Chiyoda-ku, Tokyo (JP)

(72) Inventors: Masahiro Hasegawa, Tokyo (JP); Masami Yasuda, Tokyo (JP); Hidemoto Arai, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 77 days.

(21) Appl. No.: 15/316,054

(22) PCT Filed: Jul. 4, 2014

(86) PCT No.: PCT/JP2014/067932
§ 371 (c)(1),
(2) Date: Dec. 2, 2016

(87) PCT Pub. No.: WO2016/002071
PCT Pub. Date: Jan. 7, 2016

(65) Prior Publication Data
US 2017/0108231 A1    Apr. 20, 2017

(51) Int. Cl.
*F24F 3/147* (2006.01)
*F24F 11/89* (2018.01)
(Continued)

(52) U.S. Cl.
CPC ............. *F24F 3/147* (2013.01); *F24F 7/08* (2013.01); *F24F 11/89* (2018.01); *F24F 12/003* (2013.01);
(Continued)

(58) Field of Classification Search
CPC ....... F24F 3/147; F24F 7/08; F25B 2341/064; F25B 2700/21174
(Continued)

(56) References Cited

U.S. PATENT DOCUMENTS 6,311,511 B1   11/2001  Maeda
7,493,775 B2    2/2009  Shinamoto et al.
(Continued)

FOREIGN PATENT DOCUMENTS

EP    2 224 182 A1    9/2010
EP    2 650 617 A1   10/2013
(Continued)

OTHER PUBLICATIONS

The extended European Search Report dated Jan. 23, 2018, by the European Patent Office in corresponding European Patent Application No. 14896781.3-1008 (7 pages).
(Continued)

*Primary Examiner* — Marc E Norman
(74) *Attorney, Agent, or Firm* — Buchanan Ingersoll & Rooney PC

(57) ABSTRACT

An air-conditioning and ventilation apparatus includes an air-conditioning coil that is installed on a downstream side of a heat exchanger in a supply air trunk and changes cooling capacity with respect to heat-exchanged outdoor air in multiple stages; an outdoor-air temperature and humidity sensor that detects temperature and relative humidity of the outdoor air; and a control unit that stores therein reference data in which the cooling capacity is set for each combination of temperature and relative humidity of the outdoor air such that absolute humidity of supply air becomes equal to or lower than indoor target absolute humidity on the basis of a dehumidification load corresponding to an absolute humidity difference between indoors and outdoors, and determines
(Continued)

a cooling capacity value of the air-conditioning coil on the basis of detection results during a cooling operation by the outdoor-air temperature and humidity sensor and the reference data.

7 Claims, 5 Drawing Sheets

(51) Int. Cl.
  *F24F 7/08* (2006.01)
  *F24F 12/00* (2006.01)
  *F24F 110/12* (2018.01)
  *F24F 110/22* (2018.01)
(52) U.S. Cl.
  CPC ...... *F24F 12/006* (2013.01); *F24F 2012/007* (2013.01); *F24F 2110/12* (2018.01); *F24F 2110/22* (2018.01); *Y02B 30/52* (2013.01); *Y02B 30/563* (2013.01)
(58) Field of Classification Search
  USPC .......................................................... 62/225
  See application file for complete search history.

(56) References Cited

U.S. PATENT DOCUMENTS

| 7,984,620 | B2 | 7/2011 | Shinamoto et al. |
| 2012/0023988 | A1* | 2/2012 | Togano ................. F24F 3/147 62/159 |

FOREIGN PATENT DOCUMENTS

| JP | 62-087744 A | 4/1987 |
| JP | 01-060135 U | 4/1989 |
| JP | 02-044142 A | 2/1990 |
| JP | 05-187690 A | 7/1993 |
| JP | 09-159254 A | 6/1997 |
| JP | 10-141730 A | 5/1998 |
| JP | 11-132506 A | 5/1999 |
| JP | 11-248205 A | 9/1999 |
| JP | 2000-046383 A | 2/2000 |
| JP | 2000-097478 A | 4/2000 |
| JP | 2001-041541 A | 2/2001 |
| JP | 2001-091020 A | 4/2001 |
| JP | 2001-108282 A | 4/2001 |
| JP | 2001-272086 A | 10/2001 |
| JP | 2002-089932 A | 3/2002 |
| JP | 2003-222362 A | 8/2003 |
| JP | 2005-037104 A | 2/2005 |
| JP | 2006-029598 A | 2/2006 |
| JP | 2008-151458 A | 7/2008 |
| JP | 2008-157617 A | 7/2008 |
| JP | 2009-068802 A | 4/2009 |
| JP | 2012-017889 A | 1/2012 |
| JP | 2012-042139 A | 3/2012 |
| JP | 2013-204899 A | 10/2013 |
| JP | 2013-238395 A | 11/2013 |
| WO | WO 2004/040208 | 5/2004 |
| WO | WO 2012/002296 A1 | 1/2012 |
| WO | WO 2012/077201 A1 | 6/2012 |
| WO | WO 2014/091541 A1 | 6/2014 |

OTHER PUBLICATIONS

International Search Report (PCT/ISA/210) dated Sep. 22, 2014, by the Japanese Patent Office as the International Searching Authority for International Application No. PCT/JP2014/067932.

Written Opinion (PCT/ISA/237) dated Sep. 16, 2014, by the Japanese Patent Office as the International Searching Authority for International Application No. PCT/JP2014/067932.

Office Action (Notice of Rejection) dated Aug. 22, 2017, by the Japanese Patent Office in corresponding Japanese Patent Application No. 2016-530785, and a partial English Translation of the Office Action. (7 pages).

First Office Action dated Oct. 29, 2018 in corresponding Chinese Patent Application No. 201480080212.3, and an English translation thereof.

* cited by examiner

AIR-CONDITIONING AND VENTILATION APPARATUS

FIELD

The present invention relates to an air-conditioning and ventilation apparatus.

BACKGROUND

An air-conditioning and ventilation apparatus has a total heat exchanger incorporated therein that performs heat exchange between supply air and exhaust air, and it also includes an air-conditioning coil incorporated therein intended for heating and cooling and that is located immediately behind the total heat exchanger in an air trunk on the supply air side. The air-conditioning and ventilation apparatus performs heat exchange between supply air and exhaust air with the total heat exchanger. The heat-exchanged supply air is heated or cooled by the air-conditioning coil, the indoor air and outdoor air being exchanged simultaneously with air supply and exhaust, so as to be humidified or dehumidified.

In a humidity control and ventilation apparatus disclosed in Patent Literature 1, heat exchange is performed between supply air supplied from outside into the room and exhaust air exhausted from the room to outdoors. When the outdoor temperature is equal to or higher than the preset reference temperature, control is executed to perform a dehumidifying function, and when the outdoor temperature is lower than the preset reference temperature, control is executed to perform a humidifying function.

A ventilation apparatus disclosed in Patent Literature 2 includes a control unit that controls a heating amount of an air-conditioning coil depending on outdoor air temperature and humidity so that absolute humidity of supplied air, which is from an air-conditioning and ventilation apparatus into the room, becomes equal to or higher than a reference value in order to satisfy a required humidifying amount in which a safety factor is added to an absolute humidity difference between indoor air and outdoor air with respect to indoor absolute humidity obtained on the basis of preset indoor temperature and indoor humidity.

In the dehumidification control of a heat exchange and ventilation apparatus, a known technique is to execute control to perform a dehumidifying function when the capacity of an air-conditioning coil is 100% or a fixed value lower than 100%, all times irrespective of outdoor humidity when the outdoor temperature is in a range in which a dehumidifying operation can be performed. Also a known technique is to execute control to obtain air temperature after heat exchange by calculation on the basis of target temperature set beforehand by a remote controller and detection results of indoor temperature and outdoor temperature, and to perform a dehumidifying function so that the capacity of an air-conditioning coil changes on the basis of only a temperature difference between the calculated value and the target temperature. In these techniques, the dehumidifying operation is continued irrespective of the outdoor humidity. Accordingly, there has been a problem that, even if a dehumidification load due to an absolute humidity difference between indoor air and outdoor air is small, blown-out temperature of the ventilation and air-conditioning apparatus drops excessively, thereby causing dew condensation on a surface of a blow-out grill.

As an example of executing temperature and humidity control locally in a room, an air-conditioning apparatus disclosed in Patent Literature 3 includes a control unit that sets target temperature and target humidity to control an indoor fan, a cooling dehumidifier, and a reheater on the basis of the set target temperature and target humidity, thereby enabling to control temperature and humidity in an area to be air-conditioned.

Furthermore, an air conditioner disclosed in Patent Literature 4 determines an operation mode on the basis of detected indoor temperature and outdoor air temperature during the dehumidifying operation; controls a compressor by providing a correction amount to the compressor rotation number depending on a difference between indoor humidity and indoor set humidity; and also controls an outdoor fan by providing a correction amount to the outdoor fan rotation number depending on a difference between detected room temperature and set temperature, thus performing correction of the compressor and correction of the outdoor fan alternately at a predetermined time interval and thereby executing stable control around the set temperature and humidity.

In the dehumidification control of an air conditioner that can perform reheating and dehumidification disclosed in Patent Literature 5, a difference $\Delta X$ between humidity or absolute humidity in an air-conditioned room and target humidity or absolute humidity is calculated; target evaporation temperature is set on the basis of the difference $\Delta X$ so as to execute the dehumidification control of controlling the rotation number of a compressor on the basis of the target evaporation temperature; and a difference $\Delta Tr$ between detected temperature of the air-conditioned room and target temperature is simultaneously calculated to execute temperature control of controlling an opening degree of an expansion valve of an indoor coil on the basis of the difference $\Delta Tr$.

CITATION LIST

Patent Literatures

Patent Literature 1: Japanese Patent Application Laid-open No. 2000-97478
Patent Literature 2: International Publication No. WO2012/077201
Patent Literature 3: Japanese Patent Application Laid-open No. 2006-29598
Patent Literature 4: Japanese Patent Application Laid-open No. 2001-41541
Patent Literature 5: Japanese Patent Application Laid-open No. 2012-17889

SUMMARY

Technical Problem

When temperature and humidity control is to be executed without performing ventilation with outdoor air, as disclosed in Patent Literatures 3, 4, and 5, known is a control method of performing a dehumidification operation by comparing the indoor temperature with the target temperature or by comparing the indoor humidity with the target humidity; or known is a control method of regulating the indoor temperature and the indoor humidity to a target value on the basis of the detected room temperature and indoor humidity. However, in the inventions disclosed in Patent Literatures 3, 4, and 5, the control is not the control to perform the dehumidifying operation by the air-conditioning coil, while performing heat exchange and ventilation between indoor and outdoor supply/exhaust air flows. Therefore, these inventions cannot be applied to the air-conditioning and ventilation apparatus.

Furthermore, as conventional control of an air-conditioning and ventilation apparatus that performs heating/humidification or dehumidification of heat-exchanged supply air by an air-conditioning coil, while performing heat exchange between indoor and outdoor air supply/exhaust flows as disclosed in Patent Literature 2, and when the heat-exchanged supply air is heated by the air-conditioning coil and humidified by a humidifier, the heating capacity of the air-conditioning coil is controlled on the basis of an outdoor-air temperature and humidity map such that the absolute humidity of air expelled from the air-conditioning and ventilation apparatus becomes equal to or higher than the preset indoor target absolute humidity, in order to satisfy the necessary amount of humidification obtained by adding the safety factor to the absolute humidity difference between indoor air and outdoor air. However, in Patent Literature 2, there is no disclosure about a unit that controls cooling capacity of the air-conditioning coil depending on the outdoor air temperature and humidity, when the cooling operation of the ventilation and air-conditioning apparatus is performed.

As the conventional technique when the dehumidifying operation is performed by the air-conditioning coil, while performing heat exchange and ventilation between indoor and outdoor air supply/exhaust flows, as disclosed in Patent Literature 1, such a control is know that the outdoor temperature is compared with the target temperature, and when the outdoor temperature is equal to or higher than the target temperature, the dehumidifying operation is performed, and when the outdoor temperature is lower than the target temperature, the humidifying function is performed.

In the control disclosed in Patent Literature 1, there has been a problem in that, when the indoor temperature is low and the outdoor temperature is lower than the preset reference temperature, for example if the outdoor temperature is low and the air contains high humidity, then the air-conditioning coil does not perform the dehumidifying operation, and the indoor humidity is increased more than necessary by the air heat-exchanged between the supply air and the exhaust air.

As the known control in an air-conditioning and ventilation apparatus that dehumidifies the heat-exchanged supply air by the air-conditioning coil, while performing heat exchange and ventilation between indoor and outdoor air supply/exhaust flows, when the outdoor temperature is in a range in which the dehumidifying operation can be performed irrespective of the outdoor humidity, the cooling capacity of the air-conditioning coil is always fixed to 100% or lower, and the target cooling capacity of the air-conditioning coil is determined on the basis of a temperature difference between the preset target temperature and a calculated value so as to execute the dehumidifying operation control. On/off determination of a thermostat of the air-conditioning coil is performed by using only the outdoor temperature and without using the outdoor humidity. The target temperature set by a remote controller is compared with inlet temperature of the air-conditioning coil. When the inlet temperature of the air-conditioning coil is lower than the target temperature, the cooling operation is not performed by the air-conditioning coil, and the air heat-exchanged by the heat exchanger is directly supplied into the room.

For example, when the indoor temperature and humidity are 26° C. and 50% respectively and the outdoor air temperature and humidity are 22° C. and 70% respectively, that is, when the temperature is 26° C. and the absolute humidity is 0.0105 kg/kg (DA) in the room, and the temperature is 22° C. and the absolute humidity is 0.0116 kg/kg (DA) outdoors; if it is assumed that the temperature exchange efficiency of the heat exchanger is 70% and the humidity exchange efficiency thereof is 73%, the heat-exchanged air becomes 24.8° C. and the absolute humidity becomes 0.0108 kg/kg (DA).

In this case, the absolute humidity after heat exchange is higher than the indoor absolute humidity, and if ventilation by simultaneous air supply and exhaust is continued, the indoor absolute humidity increases. Thus, user's discomfort is likely to occur; the cooling load of other air conditioners installed in the room is increased; and thus the energy-saving operation may not be performed by the entire air-conditioning system.

In this manner, when the heat-exchanged supply air is to be dehumidified by the air-conditioning coil, while performing heat exchange and ventilation between indoor and outdoor air supply/exhaust flows, if the air-conditioning coil is controlled only on the basis of the outdoor air temperature, the indoor humidity cannot be maintained in a comfortable range.

The present invention has been achieved in view of the above problems, and an objective of the present invention is to provide an air-conditioning and ventilation apparatus that operates an air-conditioning coil with a cooling capacity value at which the absolute humidity of air supplied into a room becomes equal to or lower than target absolute humidity set beforehand on the basis of outdoor air temperature and outdoor air humidity.

Solution to Problem

In order to solve the problem and achieve the objective mentioned above, the present invention relates to an air-conditioning and ventilation apparatus that exhausts indoor air to outdoors, regulates outdoor air to a pre-set indoor target temperature and a pre-set indoor target absolute humidity, and supplies the regulated outside air to a room. The air-conditioning and ventilation apparatus includes: a casing having a supply air trunk that connects an outdoor side inlet with an indoor side outlet and an exhaust air trunk that connects an indoor side inlet with an outdoor side outlet; a supply air fan that is provided on the supply air trunk to draw in the outdoor air from the outdoor side inlet and to supply the outdoor air into the room from the indoor side outlet; an exhaust air fan that is provided on the exhaust air trunk to draw in the indoor air from the indoor side inlet and to supply the indoor air to outdoors from the outdoor side outlet; a heat exchanger that is provided between the supply air trunk and the exhaust air trunk to perform heat exchange between the supply air and the exhaust air; an air-conditioning coil that is provided on a downstream side of the heat exchanger in the supply air trunk and that changes cooling capacity to outdoor air after heat exchange has been performed, the changes in cooling capacity being in multiple stages; an outdoor-air temperature and humidity sensor that detects a temperature and relative humidity of the outdoor air; and a control unit that stores therein reference data in which, on the basis of a dehumidification load corresponding to an absolute humidity difference between indoors and outdoors, the cooling capacity is set for each combination of temperature and relative humidity of the outdoor air such that absolute humidity of the supply air becomes equal to or lower than the indoor target absolute humidity, and determines a cooling capacity value of the air-conditioning coil on the basis of the reference data and detection results during cooling operation by the outdoor-air temperature and humidity sensor.

Advantageous Effects of Invention

The air-conditioning and ventilation apparatus according to the present invention can operate an air-conditioning coil with a cooling capacity value at which the absolute humidity of air supplied into a room becomes equal to or lower than indoor target absolute humidity set previously, on the basis of outdoor air temperature and outdoor air humidity.

DESCRIPTION OF EMBODIMENTS

Exemplary embodiments of an air-conditioning and ventilation apparatus according to the present invention will be explained below in detail with reference to the accompanying drawings. The present invention is not limited to the embodiments.

Embodiment

Figure 1:
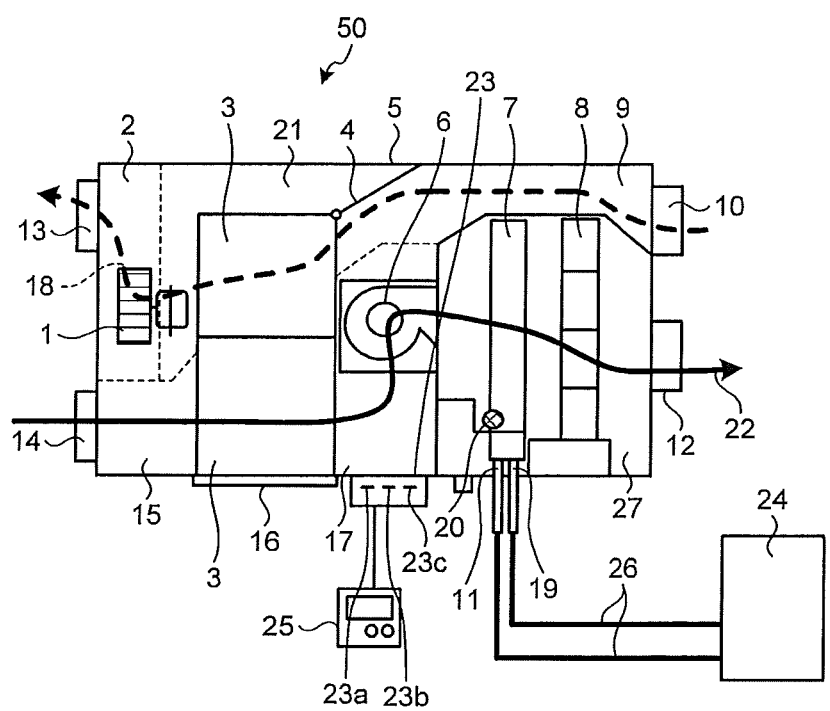
FIG. 1 is a cross-sectional view of an air-conditioning and ventilation apparatus according to an embodiment of the present invention.
Figure 2:
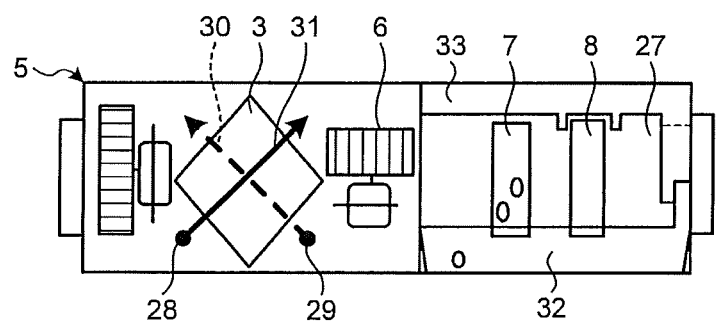
FIG. 2 is a longitudinal sectional view of the air-conditioning and ventilation apparatus according to the embodiment of the present invention.

FIG. 1 is a cross-sectional view of an air-conditioning and ventilation apparatus according to an embodiment of the present invention. FIG. 2 is a longitudinal sectional view of the air-conditioning and ventilation apparatus according to the embodiment of the present invention. An air-conditioning and ventilation apparatus 50 is provided with an outdoor side inlet 14 and an outdoor side outlet 13 as a pair on an outdoor side of a casing 5 constituting the box body of the apparatus. It is also provided with an indoor side inlet 10 and an indoor side outlet 12 as a pair on an indoor side of the casing 5. The casing 5 is provided therein with a supply air passage, which connects the outdoor side inlet 14 with the indoor side outlet 12 to supply outdoor air into a room, and with an exhaust air passage, which connects the indoor side inlet 10 with the outdoor side outlet 13 to exhaust air in the room to outside the room. The passages are independent of each other over their entirety. A heat exchanger 3 that performs heat exchanging between the supply air and the exhaust air is installed between the supply air passage and the exhaust air passage.

A supply air flow 22 in the supply air passage passes through an outdoor air suction duct 15 from the outdoor side inlet 14, passes through a supply air passage 31 in the heat exchanger 3 and a supply air trunk 17; and due to a supply air fan 6, passes through a humidifying air trunk unit 27 provided with an air-conditioning coil 7 and a humidifier 8, which is provided on the downstream side of the supply air fan 6; and is expelled to the outdoor side from the indoor side outlet 12. In FIG. 1, the supply air flow 22 is indicated by a solid-line arrow.

An exhaust air flow 18 passes through an indoor air suction trunk 9 from the indoor side inlet 10; passes through an exhaust air passage 30 in the heat exchanger 3 and past an exhaust air fan 1; passes through an exhaust air trunk 2; and is expelled from the outdoor side outlet 13. In FIG. 1, the exhaust air flow 18 is indicated by a broken-line arrow.

In the exhaust air passage, a bypass air trunk 21 is provided so that the exhaust air flow 18 does not pass through the heat exchanger 3. The exhaust air passage is also provided with a damper 4 that switches the air trunk, through which the exhaust air flow 18 passes, to either side of the exhaust air passage 30 in the heat exchanger 3 or the bypass air trunk 21.

The heat exchanger 3 can be inserted into or pulled out from the body casing 5 in a horizontal direction when a maintenance cover 16 is opened, and the two heat exchangers are incorporated therein in series. The exhaust air passage 30 and the supply air passage 31 diagonally intersect with each other in the heat exchanger 3 inside the casing 5. The heat exchanger 3 is arranged between the supply air trunk and exhaust air trunk so as to be able to continuously exchanges heat between the supply air and exhaust air. The heat exchanger 3 performs a heat-exchange process during which outdoor air can become supply air and indoor air can become exhaust air.

The bypass air trunk 21 is formed between a rear side surface of the heat exchanger 3 on a rear side as viewed from the side of the maintenance cover 16 and an inner surface of the casing 5. The damper 4 is opened and closed, and when the bypass air trunk 21 is opened, the indoor air can be exhausted outdoors by the exhaust air fan 1 without passing through the heat exchanger 3. Accordingly, ventilation without exchanging heat between supply air and exhaust air, what is called bypass ventilation, can be performed.

Figure 3:
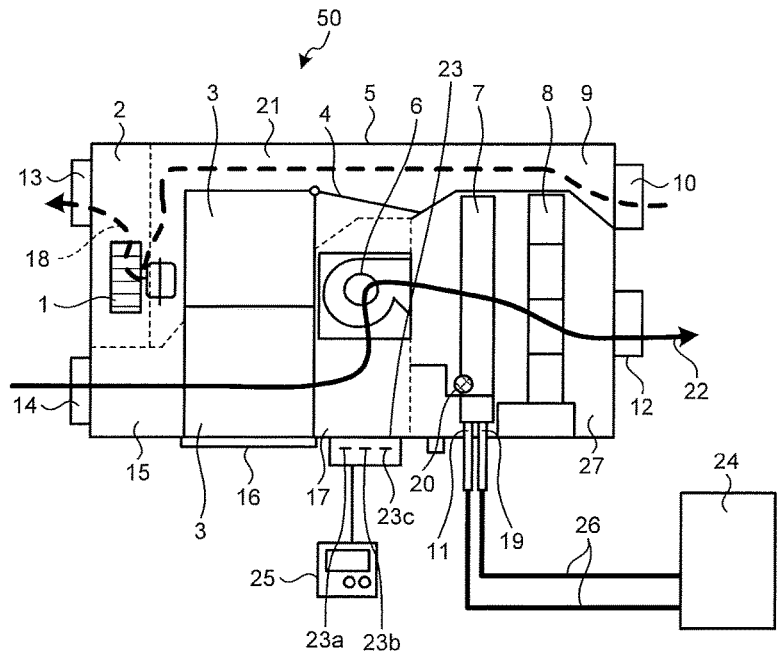
FIG. 3 is a sectional view of the air-conditioning and ventilation apparatus during bypass ventilation.

FIG. 3 is a sectional view of the air-conditioning and ventilation apparatus during bypass ventilation. During bypass ventilation, the exhaust air flow 18 passes through the bypass air trunk 21 and does not pass through the heat exchanger 3. Therefore, heat is not exchanged between the supply air flow 22 and the exhaust air flow 18.

The air-conditioning and ventilation apparatus 50 includes a control unit 23 that controls the ventilation operations and a remote controller 25 that receives operating-mode switching operations and the like. The control unit 23 includes a nonvolatile storage device 23c, which stores therein the outdoor-air temperature and a humidity map described later in a nonvolatile manner; a CPU (central processing unit) 23a; and a RAM (random access memory) 23b. The nonvolatile storage device 23c is, for example, an NVRAM (non-volatile random access memory).

The air-conditioning coil 7 has a refrigerant pipe 26 that is arranged to protrude from the casing 5 that constitutes a box body of the air-conditioning and ventilation apparatus 50. The air-conditioning coil 7 is connected to a heat source unit 24 that has a compressor, a heat-source side heat exchanger, a fan, and a throttle unit via the refrigerant pipe 26 so as to constitute a refrigeration cycle. By operating the remote controller 25, it is possible to switch between a cooling operation and a heating operation, i.e., a dehumidifying operation and a humidifying operation. As described below, the operation capacity of the air-conditioning coil 7 can be switched to multiple stages. The air-conditioning coil 7 is provided with a liquid-pipe temperature sensor 11 and a gas-pipe temperature sensor 19 as refrigerant temperature sensors for measuring the temperature of the refrigerant flowing to the air-conditioning coil 7 during the cooling operation and the heating operation. An electronic expansion valve 20 is also provided in the air-conditioning coil 7 as a refrigerant flow-rate regulation unit that regulates the flow rate of the refrigerant flowing to the air-conditioning coil of the air-conditioning and ventilation apparatus.

Furthermore, the humidifying air trunk unit 27 in which the air-conditioning coil 7 and the humidifier 8 are provided is configured from a humidifying air-trunk upper part 33 and a humidifying air-trunk lower part 32 that are disposed vertically in a divided manner as illustrated in FIG. 2. The humidifying air-trunk upper part 33 is made of foamed resin and formed into a shape covering the air-conditioning coil 7 and the humidifier 8. The humidifying air-trunk lower part 32 includes a drain pan made of foamed resin and it is formed so as to be a structure that prevents water inundating the foamed resin material by simultaneously molding a plastic material on a water receiving surface of the drain pan. The humidifying air-trunk upper part 33 and the humidifying air-trunk lower part 32 are formed in a vertically fitted structure and integrally form the humidifying air trunk unit 27.

An outdoor-air temperature and humidity sensor 28 that detects the temperature and relative humidity of the outdoor air is provided in the outdoor air suction duct 15 between the outdoor side inlet 14 and the heat exchanger 3. Further, an indoor temperature and humidity sensor 29 that detects the temperature and relative humidity of the indoor air is provided in the supply air trunk 17 between the indoor side inlet 10 and the heat exchanger 3. The control unit 23 determines the cooling capacity of the air-conditioning coil 7 on the basis of the temperature and humidity information, which are detection results by the outdoor-air temperature and humidity sensor 28 and the indoor temperature and humidity sensor 29, respectively.

The outdoor air having passed through the heat exchanger 3 is cooled and dehumidified by the air-conditioning coil 7, passes through the humidifier 8 that has stopped supplying water, and is supplied into the room from the indoor side outlet 12. At this time, the dehumidification amount and expelled-air temperature are regulated on the basis of the cooling capacity of the air-conditioning coil 7.

When supply air is directly expelled from the air-conditioning and ventilation apparatus 50 into the room, and if the expelled air temperature becomes equal to or lower than a dew point of the indoor environment, the cooling by the supply air of the expulsion grill attached to the ceiling surface causes condensate to form on the surface of the expulsion grill. Therefore, it is necessary to regulate the air temperature so that it does not drop below the dew point.

Figure 4:
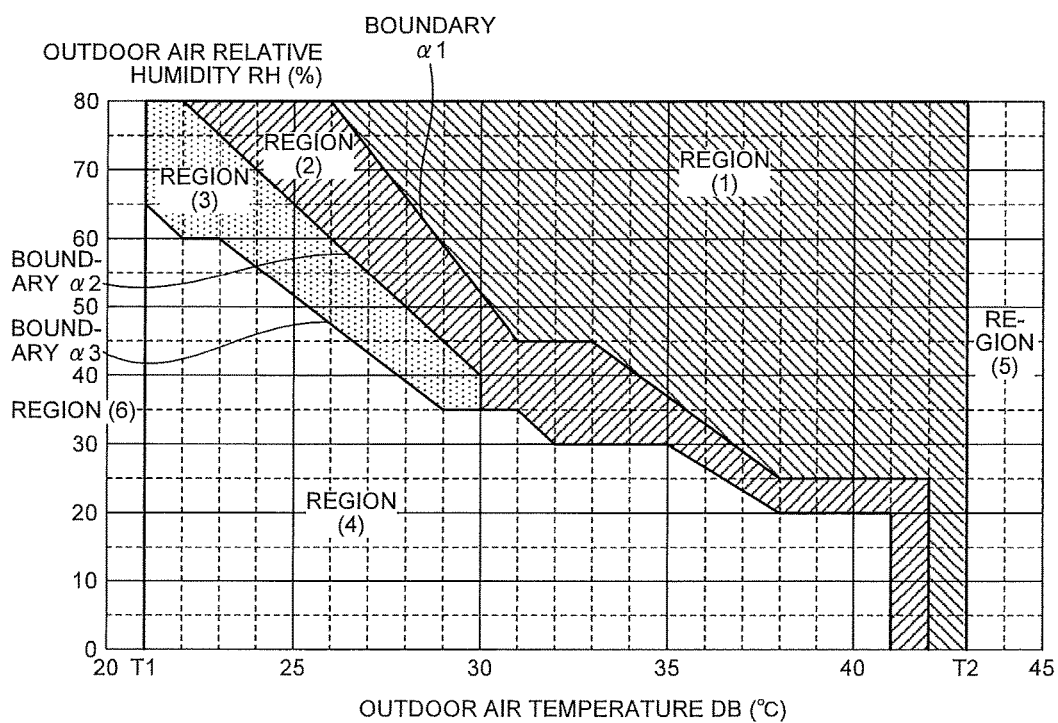
FIG. 4 is a diagram illustrating an example of an outdoor-air temperature and humidity map in which a capacity value of an air-conditioning coil of a ventilation and air-conditioning apparatus, which is controlled depending on measurement values of an outdoor-air temperature and humidity sensor, is divided into a zone of outdoor temperature and a zone of outdoor humidity.

FIG. 4 is a diagram illustrating an example of an outdoor-air temperature and humidity map in which the capacity value of the air-conditioning coil of a ventilation and air-conditioning apparatus, controlled depending on the measurement values by the outdoor-air temperature and humidity sensor, is divided into a zone of outdoor temperature and a zone of outdoor humidity. The outdoor-air temperature and humidity map is configured such that the cooling capacity of the air-conditioning coil 7 is controlled so as to satisfy the dehumidification load due to an indoor and outdoor absolute humidity difference and dehumidification is performed by calculating the outdoor absolute humidity on the basis of a preset indoor target absolute humidity and the temperature and humidity measurement values by the outdoor-air temperature and humidity sensor 28. If the absolute humidity of the air after heat exchange has been performed by the heat exchanger is lower than the indoor target absolute humidity, the cooling capacity of the air-conditioning coil 7 is controlled not so that the refrigerant is caused to flow to the air-conditioning coil 7, but so that the amount of humidity recovered by the heat exchanger 3 is used for the dehumidification load.

Specifically, in the outdoor-air temperature and humidity map illustrated in FIG. 4, the temperature and absolute humidity of the supply air after total heat exchange has been performed by the heat exchanger 3 are calculated for each combination of the outdoor air temperature, which is the temperature of the outdoor air, and outdoor air humidity, which is the humidity of the outdoor air, by using the total heat exchange efficiency of the heat exchanger 3 detected beforehand on the basis of a reference value of the preset indoor absolute humidity, for example, the absolute humidity 0.0105 kg/kg (DA) when the temperature is 26° C. and the relative humidity is 50%.

The outdoor-air temperature and humidity map illustrated in FIG. 4 is made in the manner described below. That is, the absolute humidity of the supply air after heat exchange has been performed is compared with the indoor target absolute humidity, and if the absolute humidity of the supply air after heat exchange has been performed is higher than the indoor target absolute humidity, it is determined that the dehumidification load is not satisfied and the amount that the electronic expansion valve 20 is open is increased so that the cooling capacity increases in accordance with the cooling capacity characteristic of the air-conditioning coil 7 detected and obtained beforehand. The amount the electronic expansion valve 20 is opened is then reduced stepwise according to the dehumidification load so as to be able to satisfy the dehumidification load due to the absolute humidity difference between the indoor air and the outdoor air; and thus, the capacity values of the air-conditioning coil 7 that satisfy the dehumidification load are plotted.

The outdoor-air temperature and humidity map illustrated in FIG. 4 is also made in such a manner where the dehumidification load is determined to be enough if the absolute humidity of the supply air after heat exchange has been performed is lower than the indoor target absolute humidity, and, even if refrigerant is not flowing through the air-conditioning coil 7, values that can satisfy the dehumidification load of the humidity recovery portion by using the heat exchanger 3 are obtained and plotted.

The outdoor-air temperature and humidity map is specifically described here. A region (6) where the outdoor air temperature is lower than T1 and a region (5) where the outdoor air temperature exceeds T2 are in a cooling operation prohibited range of the air-conditioning coil 7; and region (1) to region (4), where "T1≤outdoor air temperature≤T2" is established, are in the cooling operation permitted range of the air-conditioning coil 7. In the region (5), the outdoor temperature is high and is outside the operation permitted range in the specification of the heat source unit 24, and thus the cooling operation of the air-conditioning coil 7 is stopped. Moreover, in the region (6), the outdoor air temperature is low and it is not necessary for the air-conditioning coil 7 to perform the cooling operation, and thus the cooling operation is stopped.

A boundary α1 indicates an aggregation of plots at which the following expression (1) is established when the air-conditioning coil 7 is operated with a cooling capacity of 100%. A boundary α2 indicates an aggregation of plots at which the following expression (1) is established when the air-conditioning coil 7 is operated with a cooling capacity of 75%. A boundary α3 indicates an aggregation of plots at which the following expression (1) is established when the air-conditioning coil 7 is operated with a cooling capacity of 50%.

[absolute temperature of expelled air from the air-conditioning and ventilation apparatus]=[indoor target absolute humidity]   Expression (1)

In FIG. 4, the outdoor-air temperature and humidity map is made by plotting the outdoor air relative humidity at a regular interval of 5% and the outdoor air temperature at a regular interval of 5 degrees. Therefore, at the outdoor air temperature of 30 degrees, the boundary α2 and the boundary α3 overlap with each other. However, when the outdoor-air temperature and humidity map is made by plotting the temperature and the humidity with a finer interval, the boundary α2 and the boundary α3 do not overlap with each other and they continue to the high humidity side in the outdoor-air temperature and humidity map.

A region (1) indicates an outdoor-air temperature and humidity range in which the outdoor air absolute humidity is higher than the preset reference value of the indoor target absolute humidity and the air that has passed though the heat exchanger 3 cannot satisfy the dehumidification load obtained from the absolute humidity difference between the indoor air and the outdoor air, and it is an aggregation of the plots when the dehumidifying operation is performed such that the air-conditioning coil 7 operates at the maximum capacity of 100%. In other words, the region (1) indicates the outdoor-air temperature and humidity range in which the outdoor air absolute humidity is higher than the preset reference value of the indoor target absolute humidity, and it indicates the region where the following expression (2) is established.

[absolute humidity of outdoor air after heat exchange]≥[preset reference value of indoor target absolute humidity]+correction value $a$   Expression (2)

In the region (1), when aiming at a first target degree of superheat of a refrigerating cycle at which the cooling capacity of the air-conditioning coil 7 becomes 100%, the degree of superheat of the refrigerating cycle in an actual operating state is calculated by the control unit 23 on the basis of the liquid-pipe temperature sensor 11 and the gas-pipe temperature sensor 19 of the air-conditioning coil 7, and the dehumidifying operation is performed while regulating the opening degree of the electronic expansion valve 20 in an opening direction such that "the first target degree of superheat ≅ actual degree of superheat" is established. The correction value a is a first humidity correction value for preventing the humidity of the supply air from becoming lower than the indoor target absolute humidity. By satisfying the above expression (2), the absolute humidity of the outdoor air after the heat exchange has a smaller value than the indoor target absolute humidity by an amount equal to the correction value a or more. Therefore, the humidity of the supply air can be prevented from becoming lower than the indoor target absolute humidity.

A region (2) indicates an outdoor-air temperature and humidity range in which the outdoor air absolute humidity is higher than the preset reference value of the indoor target absolute humidity and the supply air after heat exchange has been performed by the heat exchanger 3 cannot satisfy the dehumidification load obtained from the absolute humidity difference between the indoor air and the outdoor air, and it is a plot aggregation when the above expression (1) is established if the operation is performed with the cooling capacity of the air-conditioning coil 7 being from 75% inclusive to less than 100%. In other words, the region (2) indicates the outdoor-air temperature and humidity range in which the absolute humidity of the supply air after total heat exchange has been performed by the heat exchanger 3 satisfies the following expression (3).

[absolute humidity of outdoor air after heat exchange]≥[preset reference value of indoor target absolute humidity]+correction value $b$   Expression (3)

In the region (2), when aiming at a second target degree of superheat of the refrigerating cycle at which the cooling capacity of the air-conditioning coil 7 becomes, for example, 75%, which is such that the above expression (1) is established, the degree of superheat of the refrigerating cycle in an actual operating state is calculated by the control unit 23 on the basis of the liquid-pipe temperature sensor 11 and the gas-pipe temperature sensor 19 of the air-conditioning coil 7, and the dehumidifying operation is performed while reducing and regulating the opening degree of the electronic expansion valve 20 more than that in the region (1) such that "the second target degree of superheat≅actual degree of superheat" is established. The correction value b is a second humidity correction value for preventing the humidity of the supply air from becoming lower than the indoor target absolute humidity. By satisfying the above expression (3), the absolute humidity of the outdoor air after the heat exchange has a smaller value than the indoor target absolute humidity by an amount equal to the correction value b or more. Therefore, the humidity of the supply air can be prevented from becoming lower than the indoor target absolute humidity.

A region (3) indicates an outdoor-air temperature and humidity range in which the outdoor air absolute humidity is higher than the preset reference value of the indoor target absolute humidity and the supply air after heat exchange has been performed by the heat exchanger 3 cannot satisfy the dehumidification load obtained from the absolute humidity difference between the indoor air and the outdoor air, and it is a region that corresponds to a plot aggregation when the above expression (1) is established if the operation is performed with the cooling capacity of the air-conditioning coil 7 being from 50% inclusive to less than 75%. In other words, the region (3) indicates the outdoor-air temperature and humidity range in which the absolute humidity of the supply air after total heat exchange has been performed by the heat exchanger 3 satisfies the following expression (4).

[absolute humidity of outdoor air after heat exchange]≥[preset reference value of indoor target absolute humidity]+correction value $c$   Expression (4)

In the region (3), when aiming at a third target degree of superheat of the refrigerating cycle at which the cooling capacity of the air-conditioning coil becomes, for example, 50% such that the above expression (1) is established, the degree of superheat of the refrigerating cycle in the actual operating state is calculated by the control unit 23 based on the liquid-pipe temperature sensor 11 and the gas-pipe temperature sensor 19 of the air-conditioning coil 7; and the dehumidifying operation is performed while reducing and regulating the opening degree of the electronic expansion valve 20 more than that in the region (2) such that "the third target degree of superheat actual degree of superheat" is established. The correction value c is a third humidity correction value for preventing the humidity of the supply air from becoming lower than the indoor target absolute humidity. By satisfying the above expression (4), the absolute humidity of the outdoor air after the heat exchange has a smaller value than the indoor target absolute humidity by an amount equal to the correction value c or more. Therefore, the humidity of the supply air can be prevented from becoming lower than the indoor target absolute humidity.

As the cooling capacity of the air-conditioning coil 7 becomes higher when the operation is performed, an error is more likely to occur in the dehumidification amount due to the air-conditioning coil 7. Therefore, the correction value a, the correction value b, and the correction value c described above are generally under a relation of "correction value a>correction value b>correction value c".

A region (4) indicates an outdoor-air temperature and humidity range, in which the absolute humidity of the outdoor air totally heat-exchanged by the heat exchanger 3 is lower than the reference value of the indoor target absolute humidity, and which is a range in which an air blasting operation is performed without causing the refrigerant to flow to the air-conditioning coil 7; that is, a range in which the air-conditioning coil 7 is off-controlled by a thermostat to perform the air blasting operation. However, if the following expression (5) is satisfied, the temperature of the outdoor air is sufficiently lower than the indoor target temperature. Therefore, heat exchange by the heat exchanger 3 is not performed and the outdoor air is supplied into the room. If the following expression (5) is not satisfied, heat exchange is performed.

[detected temperature value of outdoor-air temperature by the humidity sensor 28]≤[indoor target temperature]−correction value $d$       Expression (5)

The correction value d is a temperature correction value for preventing the temperature of supply air from becoming lower than the indoor target temperature.

The control unit 23 stores the outdoor-air temperature and humidity map described above in the nonvolatile storage device; and during an operation in a cooling mode and an operation in a dehumidifying mode, the control unit 23 executes control of a refrigerant flow rate to the air-conditioning coil 7 on the basis of the outdoor-air temperature and humidity map.

Figure 5:
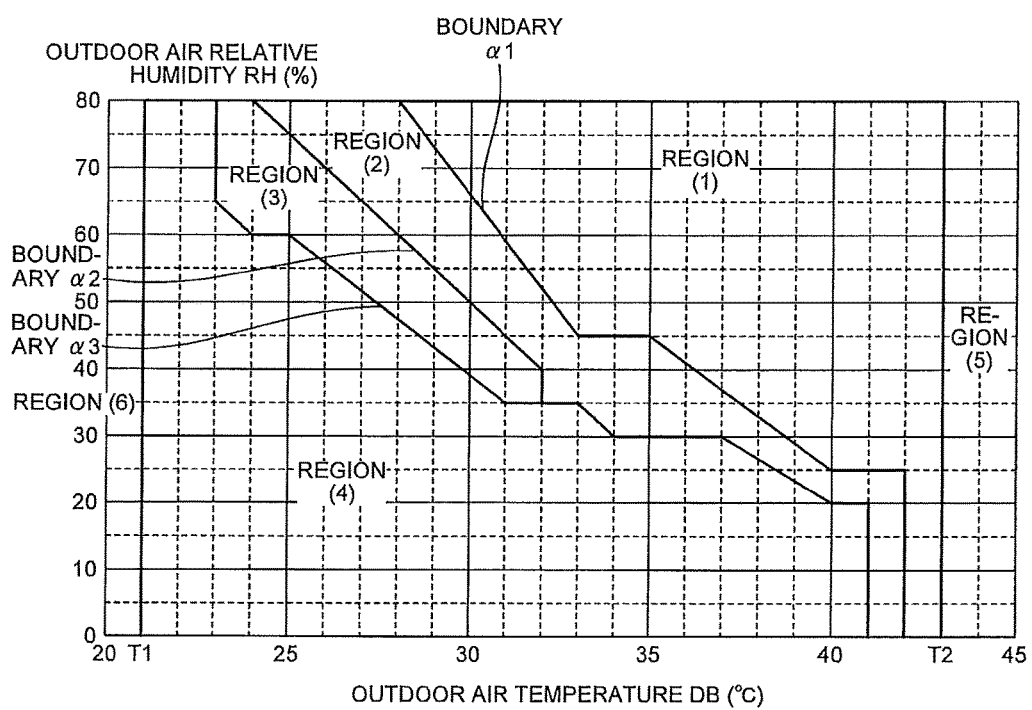
FIG. 5 is a diagram illustrating an outdoor-air temperature and humidity map in which preset indoor target absolute humidity is changed to be set to a higher value.

FIG. 5 is a diagram illustrating an outdoor-air temperature and humidity map in which preset indoor target absolute humidity is changed to be set to a higher value. During the cooling operation, for example, it is assumed that the outdoor air temperature is 35° C. and the relative humidity is 40%, that is, the absolute humidity is 0.0141 kg/kg (DA); and if the indoor target absolute humidity becomes higher than the reference value of the indoor target absolute humidity, the dehumidification load obtained from the absolute humidity difference between the indoor air and the outdoor air decreases; and the boundary lines α1 to α3 move toward the high temperature side of the outdoor air temperature on the outdoor-air temperature and humidity map, and thus the outdoor-air temperature and humidity range in which the thermostat off is performed in the region (4) expands. The control unit 23 stores the outdoor-air temperature and humidity map so that the map is switched on the basis of the high, medium, and low levels of the preset indoor target temperature and indoor target absolute humidity. That is, the outdoor-air temperature and humidity map can be stored in the non-volatile storage device 23c for each combination of the indoor target temperature and the indoor target absolute humidity; and the outdoor-air temperature and humidity map to be used can be switched by the control unit 23 on the basis of which combination of the indoor target temperature and the indoor target absolute humidity has been selected.

Furthermore, an outdoor-air temperature and humidity map, in which a heating amount of the air-conditioning coil 7 is controlled to perform humidification on the basis of whether the operation mode of the air-conditioning and ventilation apparatus 50 is the heating mode or the cooling mode, for example, depending on the outdoor air temperature and humidity disclosed in Patent Literature 2, can be stored in the non-volatile storage device 23c; and the control unit 23 can switch the outdoor-air temperature and humidity map on the basis of a combination of the preset indoor target temperature and the indoor target absolute humidity. That is, non-volatile storage device 23c can store therein a plurality of outdoor-air temperature and humidity maps, for example, an outdoor-air temperature and humidity map for the operation in the cooling mode and an outdoor-air temperature and humidity map for the operation in the heating mode, for each combination of the target set temperature and the set absolute humidity; and the control unit 23 can select an outdoor-air temperature and humidity map to be used on the basis of the operation mode, the target set temperature, and the target set humidity.

Figure 6:
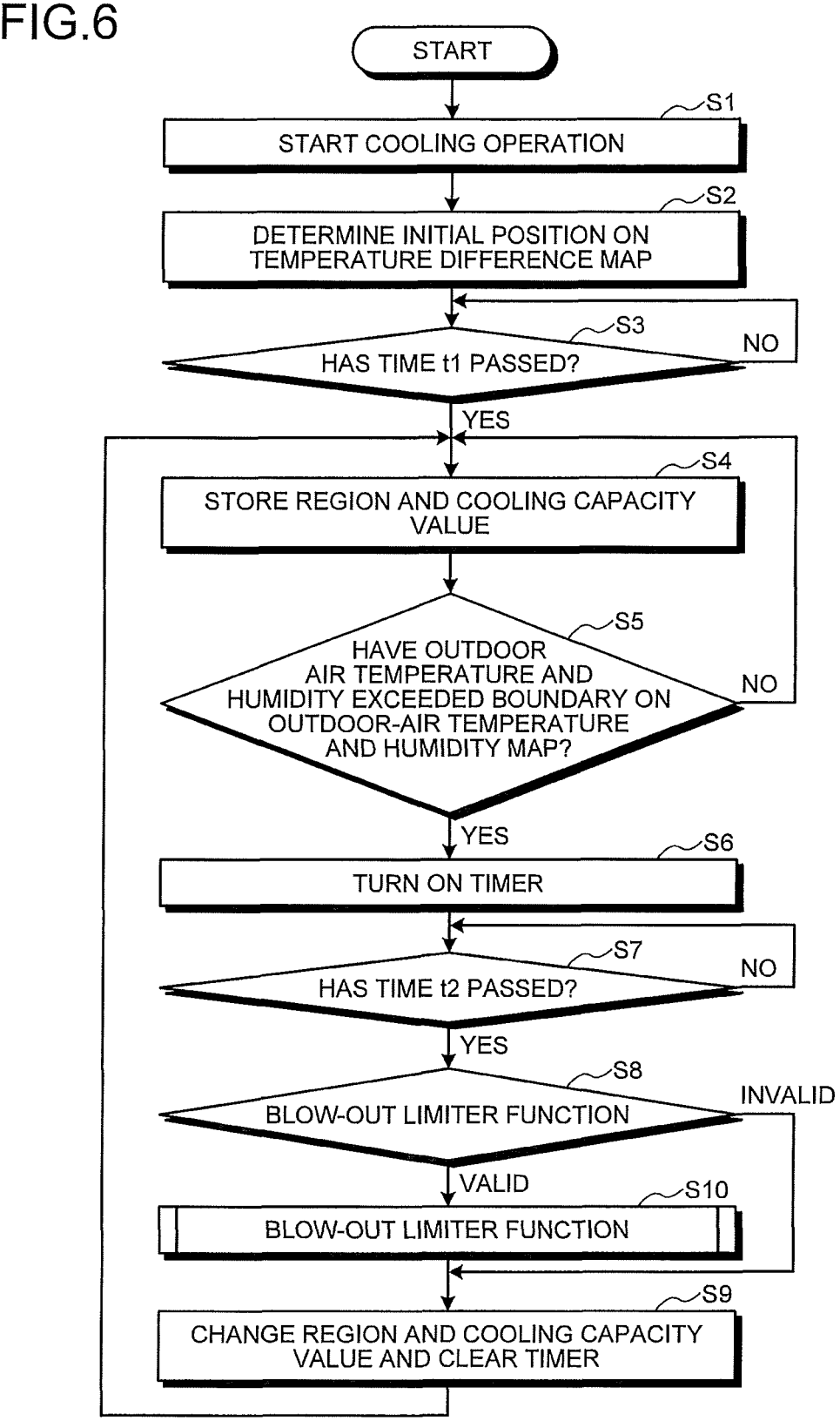
FIG. 6 is a flowchart illustrating a control flow of an air-conditioning coil during an operation in a cooling mode or a dehumidifying mode.

FIG. 6 is a flowchart illustrating a control flow of the air-conditioning coil during an operation in the cooling mode or the dehumidifying mode. When a cooling operation or a dehumidifying operation is started via the remote controller 25, the control unit 23 starts the operation of the air-conditioning and ventilation apparatus in the cooling mode or the dehumidifying mode (Step S1). The control unit 23 performs initial determination of the region on the basis of a detection result by the outdoor-air temperature and humidity sensor 29 so as to operate the air-conditioning coil 7 with a cooling capacity value corresponding to the region corresponding to the outdoor air temperature and humidity. For example, if the outdoor air temperature and humidity correspond to the region (2), the control unit 23 operates the air-conditioning coil 7 with the cooling capacity of 75%. However, if the outdoor air temperature and humidity correspond to the region (5) or (6), because the region is not in the cooling operation permitted range, the air-conditioning coil 7 is off-controlled by a thermostat (Step S2). Thereafter, the control unit 23 determines whether a time t1 has passed since execution of control at Step S2 (Step S3). If the time t1 has not passed (NO at Step S3), the control unit 23 continues the determination whether the time t1 has passed since the execution of control at Step S2 (Step S3).

If the time t1 has passed since the execution of control at Step S2 (YES at Step S3), the control unit 23 shifts the air-conditioning and ventilation apparatus from the initial state to a steady state.

After shifting to the steady state, the control unit 23 stores therein the region when the time t1 has passed and the target degree of superheat on a refrigerating cycle, which corresponds to the cooling capacity (Step S4). The control unit 23 executes control of the air-conditioning coil 7, aiming at the stored target degree of superheat. The control unit 23 determines whether the outdoor air temperature and humidity have changed from the current region to another region, in other words, whether the outdoor air temperature and humidity have exceeded the boundary on the outdoor-air temperature and humidity map (Step S5). If the outdoor air temperature and humidity have not exceeded the boundary on the outdoor-air temperature and humidity map (NO at Step S5), the control unit 23 maintains the cooling capacity in the current region.

If the outdoor air temperature and humidity have exceeded the boundary on the outdoor-air temperature and humidity map (YES at Step S5), the control unit 23 turns on a timer that detects a time t2 (Step S6). The timer that detects the time t2 is intended to prevent the chattering of repeated thermostat on/off because outdoor air temperature and humidity are changed while shifting the boundary, and to avoid that a target degree of superheat on the refrigerating cycle changes due to a region change and the opening degree of the electronic expansion valve largely changes so as to destabilize the refrigerating cycle. The control unit 23 determines whether the time t2 has passed since turn-on of the timer (Step S7). If the time t2 has not passed (NO at Step S7), the control unit 23 repeats the determination whether the time t2 has passed since the turn-on of the timer (Step S7).

If the time t2 has passed since the turn-on of the timer (YES at Step S7), the control unit 23 determines if a blow-out limiter function is set to be valid or invalid (Step S8). If the blow-out limiter function is set to be invalid (invalid at Step S8), the control unit 23 changes the region and the cooling capacity and clears the timer (Step S9). Thereafter, the control unit 23 returns to Step S4 where the region and the cooling capacity immediately after passage of the time t2 are stored.

If the blow-out limiter function is set to be valid (valid at Step S8), the control unit 23 performs the blow-out limiter function (Step S10). After Step S10, the control unit 23 performs the process at Step S9.

Figure 7:
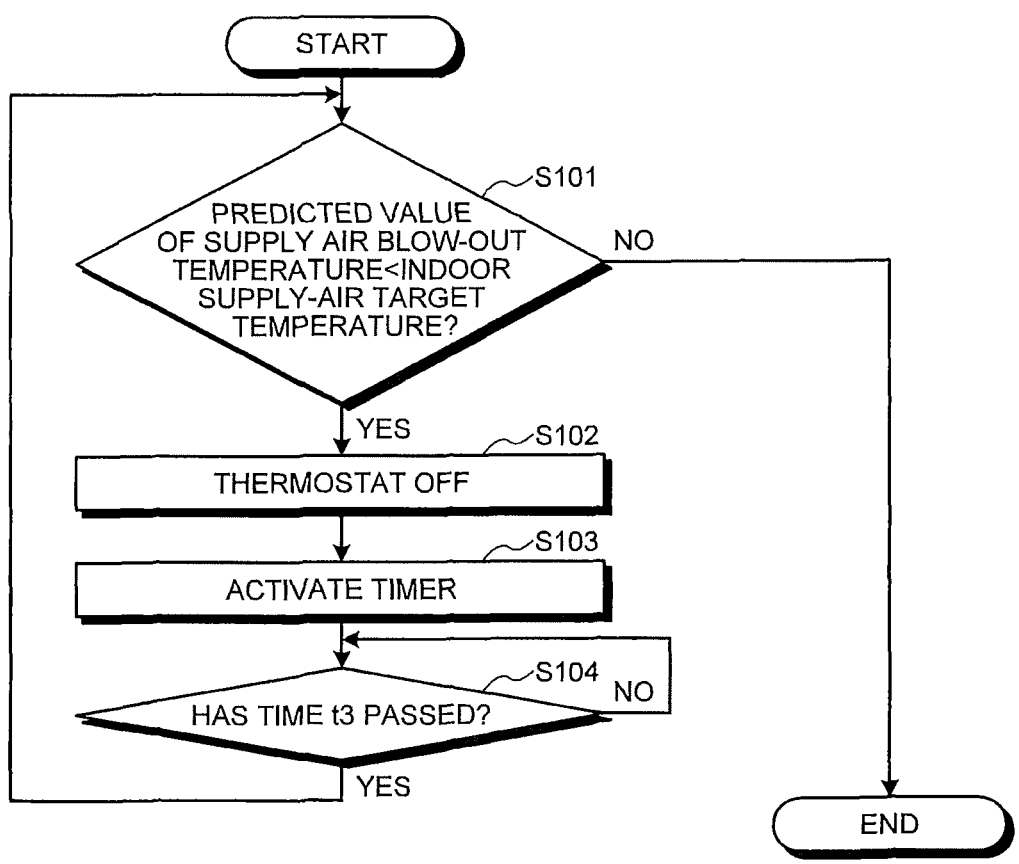
FIG. 7 is a flowchart illustrating an operation flow of a blow-out limiter function.

FIG. 7 is a flowchart illustrating an operation flow of the blow-out limiter function. The control unit 23 predicts (or, determines) an inlet air state of the air-conditioning coil 7 on the basis of the total heat exchange efficiency of the heat exchanger obtained by measurements beforehand and measurement values of the indoor temperature by the humidity sensor 29, the outdoor-air temperature, and humidity sensor 28. Further, the control unit 23 predicts outlet temperature of the air-conditioning coil 7, that is, the supply air blow-out temperature on the basis of sensible heat exchange efficiency of the air-conditioning coil 7 obtained by measurements performed beforehand on the basis of the target degree of superheat of the refrigerating cycle, the measurement value of the liquid-pipe temperature sensor 11, and the inlet air state of the air-conditioning coil 7. The control unit 23 compares the predicted (or, determined) value of the supply air blow-out temperature of the air-conditioning and ventilation apparatus with the indoor supply-air target temperature preset by the control unit 23 (Step S101). If a relation of "the predicted value of the supply air blow-out temperature<the indoor supply-air target temperature" is established due to excessive drop of the blow-out temperature (YES at Step S101), the control unit 23 forcibly causes the air-conditioning coil 7 to be off-controlled by a thermostat as preventive detects of dew condensation on the indoor blow-out surface installed on an indoor ceiling or the like (Step S102). The control unit 23 then starts the timer (Step S103). The control unit 23 determines whether a time t3 has passed since the start of the timer (Step S104). If the time t3 has not passed (NO at Step S104), the control unit 23 repeats the determination whether the time t3 has passed since the activation of the timer (Step S104). If the time t3 has passed since the activation of the timer (YES at Step S104), the control unit 23 compares the predicted value of the supply air blow-out temperature with the indoor supply-air target temperature (Step S101).

At this time, the refrigerant is not flowing to the air-conditioning coil 7 and the air-conditioning coil 7 is in the off-controlled state by a thermostat. Therefore, the control unit 23 uses the predicted value of the supply air blow-out temperature of the air-conditioning and ventilation apparatus on the basis of the total heat exchange efficiency of the heat exchanger 3 obtained by measurements performed beforehand and measurement values of the indoor temperature and humidity sensor 29 and the outdoor-air temperature and humidity sensor 28.

If the relation of the predicted value of the supply air blow-out temperature<the indoor supply-air target temperature is not established (NO at Step S101), there is no chance of dew condensation, and thus the control unit 23 finishes the operation as the blow-out limiter function.

After completion of the operation as the blow-out limiter function, the process proceeds to Step S9.

In a known air-conditioning and ventilation apparatus, even if temperature of the outdoor air is low, the dehumidifying operation can be done by setting the target temperature low. For example, if the air-conditioning coil is operated such that the cooling capacity of the air-conditioning coil becomes 100%, and when the outdoor air temperature is low and the dehumidification load due to the absolute humidity difference between the indoor air and the outdoor air is small, the refrigerant flows to the air-conditioning coil so as to perform dehumidification more than necessary, thereby decreasing the air temperature after dehumidification. When the air is expelled into the room in this state, and if the supply air temperature from the air-conditioning and ventilation apparatus is lower than the dew-point temperature of the indoor environment, the blow-out grill installed on a ceiling surface or the like is cooled by the supply air, thereby causing dew condensation on the surface of the blow-out grill.

On the other hand, according to the present embodiment, by executing control with the blow-out temperature limiter function of the air-conditioning and ventilation apparatus, even if temperature and humidity of the outdoor air are low, the blow-out temperature from the air-conditioning and ventilation apparatus does not drop excessively; and thus there is no dew condensation on the surface of the blow-out grill installed on the ceiling surface or the like and the feeling of cold air from the blow-out grill can be reduced. The air-conditioning coil is off-controlled by a thermostat in an early stage, thereby enabling to avoid damage due to water leakage into the room by dew condensation.

In the control described above, change of the cooling capacity value and thermostat on/off are not performed even if the measurement value by the outdoor-air temperature and humidity sensor 28 changes and goes over the region determined at Step S2, until the time t1 has passed since execution of control at Step S2. Therefore, a sensor measurement error with respect to the temperature and humidity of the air flow flowing during an initial operation can be reduced, and the startup instability of the refrigerating cycle can be eliminated.

The indoor supply-air target temperature to be set beforehand can be changed at multiple stages by the control unit 23 or the remote controller 25. For example, the control unit 23 or the remote controller 25 can change the indoor supply-air target temperature into three stages by selecting high, medium, or low.

The air-conditioning and ventilation apparatus, which executes the control described above, performs heat exchange between supply air and exhaust air and performs ventilation by simultaneous air supply and exhaust between indoor air and outdoor air, while cooling and dehumidifying the supply air by the air-conditioning coil 7 can be operated more comfortably and in a better energy saving manner than that in the known control manner. That is, the dehumidifying operation depending on the dehumidification load due to the absolute humidity difference between indoor air and outdoor air can be performed, thereby enabling to prevent the air-conditioning coil from over cooling, to prevent the blow-out temperature from the air-conditioning and ventilation apparatus from dropping excessively, and to perform ventilation in energy-saving manner comfortably.

According to the present embodiment, regarding the absolute humidity difference between indoor air and outdoor air, when the dehumidification load is small, the outdoor temperature and outdoor humidity, which are measurement values by the outdoor-air temperature and humidity sensor, are used for determination of the thermostat on/off and the target cooling capacity of the air-conditioning coil, thereby enabling to perform the dehumidifying operation with the cooling capacity of lower than 100% of the air-conditioning coil. Accordingly, supply air is expelled from the air-conditioning and ventilation apparatus in a state with the humidity of the air being equal to or lower than the preset indoor absolute humidity; and thus it can be prevented that unnecessary dehumidification is performed. Therefore, the cooling loads of other air-conditioners installed in a room decrease, thereby enabling to perform an energy saving operation as the entire system.

According to the present embodiment, by setting the preset indoor temperature and indoor absolute humidity to be equal to or higher than reference values, the dehumidification load decreases more than that at the time of setting the reference values; and a target cooling capacity range, in which the air-conditioning coil is on-controlled by a thermostat on the basis of the measurement values by the outdoor-air temperature and humidity sensor, moves toward a high temperature side of the outdoor air temperature. In contrast, on a low temperature side of the outdoor air temperature, a region, in which the air-conditioning coil is off-controlled by a thermostat, expands. Therefore, the compressor incorporated in the heat source unit is stopped, thereby enabling to reduce the power consumption for the heat source unit and to perform the energy saving operation as the entire system.

According to the present embodiment, by using low-temperature and low-humidity outdoor air during thermostat off of the air-conditioning coil, the sensible heat load in the room can be reduced without operating the heat source unit. Even if ventilation by simultaneous air supply and exhaust is continued, the indoor absolute humidity decreases, which hardly gives an uncomfortable feeling.

According to the present embodiment, because the indoor dew-point temperature is obtained on the basis of the measurement values of the indoor temperature and humidity sensor arranged in the casing, the air-conditioning and ventilation apparatus can automatically determine the blow-out limiter temperature depending on the ambient environment where the air-conditioning and ventilation apparatus is installed.

According to the present embodiment, it can be selected whether to prioritize removal of the sensible heat load or removal of a latent heat load by the air-conditioning coil depending on a use application and a usage environment.

In this manner, according to the present embodiment, the air-conditioning and ventilation apparatus includes: the heat exchanger that is installed between the supply air trunk and the exhaust air trunk so as to perform heat exchange between supply air and exhaust air; the air-conditioning coil that is installed on the downstream side of the heat exchanger in the supply air trunk and can change cooling capacity with respect to heat-exchanged supply air in multiple stages; the outdoor-air temperature and humidity sensor that detects temperature and relative humidity of outdoor air; and the control unit that stores therein reference data in which the cooling capacity is set for each combination of temperature and relative humidity of outdoor air so that the absolute humidity of air to be supplied into a room becomes equal to or lower than the indoor target absolute humidity, and determines a cooling capacity value of the air-conditioning coil on the basis of the detection results by the outdoor-air temperature and humidity sensor and the reference data. Accordingly, when it is not necessary to operate the air-conditioning coil with the capacity of 100% during the cooling operation, the energy-saving operation can be performed with less capacity of the air-conditioning coil.

INDUSTRIAL APPLICABILITY

As described above, the air-conditioning and ventilation apparatus according to the present invention is useful because the air-conditioning and ventilation apparatus can perform a dehumidifying operation by the air-conditioning coil with the capacity needed, and particularly is suitable for forming an air-conditioning system when used together with other air conditioners.

REFERENCE SIGNS LIST

1 exhaust air fan, 2 exhaust air trunk, 3 heat exchanger, 4 damper, 5 casing, 6 supply air fan, 7 air-conditioning coil, 8 humidifier, 9 indoor air suction trunk, 10 indoor side inlet, 11 liquid-pipe temperature sensor, 12 indoor side outlet, 13 outdoor side outlet, 14 outdoor side inlet, 15 outdoor air suction duct, 16 maintenance cover, 17 supply air trunk, 18 exhaust air flow, 19 gas-pipe temperature sensor, 20 electronic expansion valve, 21 bypass air trunk, 22 supply air flow, 23 control unit, 24 heat source unit, 25 remote controller, 26 refrigerant pipe, 27 humidifying air trunk unit, 28 outdoor-air temperature and humidity sensor, 29 indoor temperature and humidity sensor, 30 exhaust air passage, 31 supply air passage, 32 humidifying air-trunk lower part, 33 humidifying air-trunk upper part, 50 air-conditioning and ventilation apparatus.

The invention claimed is:
1. An air-conditioning and ventilation apparatus that exhausts indoor air to outdoors, regulates outdoor air to a pre-set indoor target temperature and a pre-set indoor target absolute humidity, and supplies the regulated outside air to a room, the air-conditioning and ventilation apparatus comprising:
  a casing having
    a supply air trunk that connects an outdoor side inlet with an indoor side outlet and
    an exhaust air trunk that connects an indoor side inlet with an outdoor side outlet;
  a supply air fan that is provided on the supply air trunk to draw in the outdoor air from the outdoor side inlet and to supply the outdoor air into the room from the indoor side outlet;

an exhaust air fan that is provided on the exhaust air trunk to draw in the indoor air from the indoor side inlet and to supply the indoor air to outdoors from the outdoor side outlet;

a heat exchanger that is provided between the supply air trunk and the exhaust air trunk to perform heat exchange between the supply air and the exhaust air;

an air-conditioning coil that is provided on a downstream side of the heat exchanger in the supply air trunk and that changes a cooling capacity to the outdoor air after heat exchange has been performed, the changes in the cooling capacity being in multiple stages;

an outdoor-air temperature and humidity sensor that detects a temperature and relative humidity of the outdoor air; and a control unit that stores therein reference data in which, on the basis of a dehumidification load corresponding to an absolute humidity difference between indoors and outdoors, the cooling capacity is determined for each combination of temperature and relative humidity of the outdoor air such that absolute humidity of the supply air becomes equal to or lower than the indoor target absolute humidity, and sets a cooling capacity value of the air-conditioning coil on the basis of the reference data and detection results during a cooling operation by the outdoor-air temperature and humidity sensor.

2. The air-conditioning and ventilation apparatus according to claim 1, wherein the indoor target temperature and the indoor target absolute humidity are selected from a plurality of combinations to be set, and the control unit holds the reference data for each combination of the indoor target temperature and the indoor target absolute humidity.

3. The air-conditioning and ventilation apparatus according to claim 1, further comprising:

a refrigerant flow-rate regulation unit that regulates a flow rate of a refrigerant flowing to the air-conditioning coil, and a refrigerant temperature sensor that detects a temperature of the refrigerant flowing to the air-conditioning coil, wherein the control unit calculates an actual degree of superheat of the refrigerant on the basis of a detection result of the refrigerant temperature sensor, and the control unit controls the refrigerant flow-rate regulation unit such that the actual degree of superheat of the refrigerant becomes a target degree of superheat corresponding to the cooling capacity determined on the basis of the reference data.

4. The air-conditioning and ventilation apparatus according to claim 3, further comprising:

a bypass air trunk that guides the indoor air from the indoor side inlet to the outdoor side outlet without passing through the heat exchanger; and a damper that switches between the exhaust air trunk and the bypass air trunk, wherein the control unit stores therein a first humidity correction value, a second humidity correction value smaller than the first humidity correction value, a third humidity correction value smaller than the second humidity correction value, and a temperature correction value, and when absolute humidity of outdoor air heat-exchanged by the heat exchanger is higher than the indoor target absolute humidity by the first humidity correction value or more, the control unit sets the target degree of superheat as a first target degree of superheat, when absolute humidity of outdoor air after heat exchange has been performed by the heat exchanger is higher than the indoor target absolute humidity by an amount equal to the second humidity correction value or more, the control unit sets the target degree of superheat as a second target degree of superheat larger than the first target degree of superheat, when absolute humidity of outdoor air after heat exchange has been performed by the heat exchanger is higher than the indoor target absolute humidity by the third humidity correction value or more, the control unit sets the target degree of superheat as a third target degree of superheat larger than the second target degree of superheat, when absolute humidity of outdoor air after heat exchange has been performed by the heat exchanger is lower than the indoor target absolute humidity, and temperature of the outdoor air is lower than the indoor target temperature by an amount equal to the temperature correction value or more, the control unit turns off the air-conditioning coil with a thermostat and controls the damper such that the indoor air passes through the bypass air trunk, and when absolute humidity of outdoor air after heat exchange has been performed by the heat exchanger is lower than the indoor target absolute humidity, and temperature of the outdoor air is higher than the indoor target temperature by an amount less than the temperature correction value, the control unit turns off the air-conditioning coil with a thermostat and controls the damper such that the indoor air passes through the exhaust air trunk.

5. The air-conditioning and ventilation apparatus according to claim 4, further comprising an indoor temperature and humidity sensor that detects temperature and relative humidity of the indoor air, wherein the control unit determines a temperature of the supply air on the basis of a temperature and absolute humidity of outdoor air detected by the outdoor-air temperature and humidity sensor, temperature and relative humidity of indoor air detected by the indoor temperature and humidity sensor, and temperature of the refrigerant detected by the refrigerant temperature sensor, and when a determined value of a temperature of the supply air is lower than the indoor target temperature, the control unit stops cooling with the air-conditioning coil and performs an air blasting operation, and when, after cooling by the air-conditioning coil has been stopped and a preset time has passed, the determined value of a temperature of the supply air becomes equal to or higher than a threshold temperature, the control unit cancels the cooling stop by the air-conditioning coil.

6. The air-conditioning and ventilation apparatus according to claim 5, wherein the indoor target temperature is a dew-point temperature in a room.

7. The air-conditioning and ventilation apparatus according to claim 5, wherein it can be set whether or not to perform a comparison between the indoor target temperature and the determined value of temperature of the supply air, and if it is set not to perform the comparison, a dehumidifying operation by the air-conditioning coil is continued until humidity of the indoor air detected by the indoor temperature and humidity sensor becomes the indoor target absolute humidity.

\* \* \* \* \*